May 17, 1955 F. PAGANO 2,708,612

PACKING CUP

Filed Oct. 1, 1954

INVENTOR.

Frank Pagano.

BY

Harry B. Cook, ATTORNEY

United States Patent Office 2,708,612
Patented May 17, 1955

2,708,612

PACKING CUP

Frank Pagano, Newark, N. J.

Application October 1, 1954, Serial No. 459,581

3 Claims. (Cl. 309—33)

This invention relates generally to hydraulic brake actuating systems and more particularly to a new and useful improvement in a packing or sealing cup for use with piston assemblies in such systems.

In fluid pressure systems such as hydraulic brake systems which employ a piston and cylinder combination there is associated with the head of the piston a yieldable packing cup which is usually made of rubber or a rubber compound. In order that the piston may properly move within the cylinder, there is provided a clearance between the piston and the cylinder wall which increases as the piston and the cylinder wall wear. When this construction, especially when worn, is subjected to fluid pressure, the fluid is likely to leak around the packing cup and piston head causing an uneven application of the brakes.

It is therefore a prime object of the present invention to provide a piston assembly with a packing cup having novel means for providing a seal between the cup and wall of the cylinder bore in order to prevent leakage around the cup and piston head.

Another object of the invention is to provide a piston assembly with an improved packing or sealing cup designed for advantageous employment in master and wheel cylinders of hydraulic brake actuating systems.

A specific object of the invention is to provide a packing cup for a piston assembly having an annular lip and a central conical solid boss projecting beyond the lip so as to deflect the fluid against the annular lip for pressing said lip against the wall of the cylinder bore and for bulging the base of the cup against said wall.

It is further proposed to produce a seal-proof packing cup for piston assemblies which is simple and rugged in construction and which can be manufactured in mass production so as to be sold at a low cost.

Other objects and advantages of the invention will be apparent from the description thereof to follow taken in connection with the accompanying drawings in which—

Figure 1:
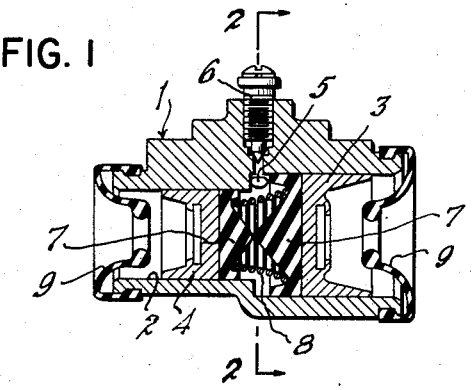
Figure 1 is a central sectional view showing a packing cup embodying the invention applied to a two-piston arrangement within a wheel cylinder of a hydraulic brake actuating system.
Figure 2:
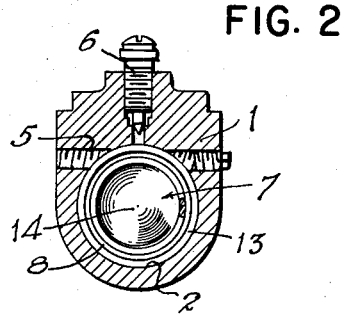
Figure 2 is a cross-sectional view taken on the plane of the line 2—2 of Figure 1.
Figure 5:
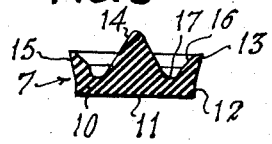
Figure 5 is a sectional view of the packing cup taken through the center thereof.
Figure 4:
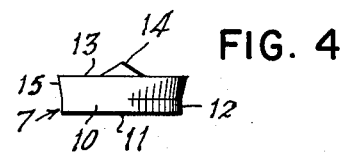
Figure 4 is a side elevational view of the improved packing cup.

Referring in detail to the drawing, in Figures 1 and 2 a packing cup made in accordance with the invention is shown applied to a wheel cylinder 1 of the hydraulically operated dual piston type. The cylinder 1 has a step-cut type bore 2 in which reciprocates a piston 3 of large diameter and a piston 4 of smaller diameter, each arranged to act upon one of the shoes of a brake drum (not shown). An inlet opening 5 in the cylinder is disposed between the pistons and the usual bleeding valve 6 is provided.

Each piston is provided with a packing or sealing cup 7 made in accordance with the invention. Interposed between the cups 7 is a spring 8 for maintaining the cups in contact with the pistons. Boots 9 are frictionally supported on the ends of the cylinder to prevent foreign matter such as oil and dirt from entering into the interior of the cylinder.

The packing or sealing cup 7 is formed of rubber or rubber compound or any other suitable resilient material and has a cup-shaped body with a circular base portion 10 having a flat bottom surface 11 and a cylindrical peripheral edge 12. An annular lip portion 13 extends outwardly of the periphery of the base portion and a solid conical boss 14 is formed integrally with the base portion and extends outwardly from the center thereof with its apex projecting beyond the lip 13. The lip portion is shaped with an outwardly and laterally flaring outer surface 15 and with an outwardly and laterally flaring inner surface 16 continuing into a semi-round annular groove 17 between the lip portion and the boss portion.

Figure 3:
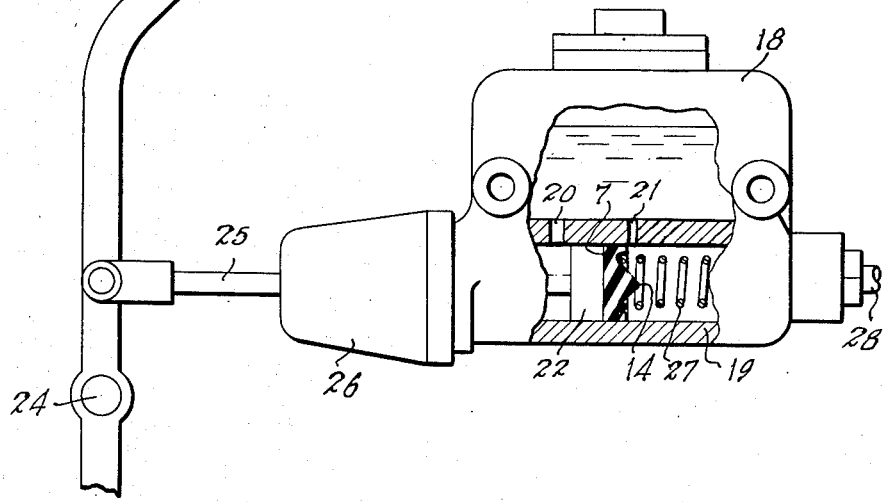
Figure 3 is a fragmentary side elevational view of a hydraulic brake actuating system showing the improved packing cup applied to a piston within a master cylinder, parts being shown broken away and parts being shown in section.

In Figure 3, the improved packing and sealing cup 7 is shown embodied in a conventional compensating type master cylinder of a hydraulic brake actuating system. The cylinder comprises a reservoir 18, a cylinder 19 with spaced compensating ports 20 and 21 and a piston 22. The piston is connected to a foot pedal 23, above its pivot 24, by a piston rod 25 which passes through a boot 26 on the adjacent end of the cylinder. The packing cup 7 is shown applied to the piston 22 and is maintained in position thereon by the return spring 27. When the piston is in its retracted position as shown, the packing cup uncovers the compensating port 21 in the cylinder wall for permitting free communication in both directions between cylinder 19 and reservoir 18. The liquid is forced from the cylinder by the piston through the usual pipe 28 to the wheel cylinders.

The construction and arrangement of the packing and sealing cup 7 is such that when the braking fluid under pressure initially enters either the wheel cylinder 1 of Figure 1 or when the piston 22 of the master cylinder 19 of Figure 3 is initially moved by the pedal 23, the fluid initially strikes the protruding apex portion of the conical boss 14 of the cup which deflects the fluid laterally toward the lip portion 13 thereby expanding such lip portion and pressing it intimately into sealing contact with the wall of the bore of the cylinder. As the fluid pressure is increased, the fluid will press the mass of the material constituting the boss 14 inwardly toward the pistons, slightly flattening the boss, which action is transmitted to the base portion 10 of the cup thereby radially expanding such base portion and the lip 13 into tighter sealing contact with the wall of the bore of the cylinder as shown in Figures 1 and 3.

The tapered lip portion 13 of the packing cup decreases the possibility of the lip portion collapsing and also makes the lip more sensitive to pressure which results in improved sealing characteristics because of the even distribution of the fluid pressures around the inner surface of the cup lip.

It is to be understood that the present invention may be used in other types of hydraulic systems and may also be used with pneumatic systems and the like, and it is to be further understood that changes in details of construction might be made within the scope or principle of the invention.

Having thus described my invention, what I claim as new and desire to secure by United States Letters Patent is:

1. In fluid pressure apparatus of the class described, a cylinder, a piston reciprocal therein, and a packing device carried by the head of said piston, said packing device having a cup-shaped body with a disc-shaped base, an annular lip portion extending outwardly of the periphery of said base and a solid boss formed integrally with the base and extending axially of the piston beyond the plane of the lip portion and presenting a conical surface toward the fluid in the cylinder, said boss being adapted to be directly acted upon by fluid pressure in the cylinder whereby the fluid is initially deflected toward the lip portion for forcing said lip portion into sealing contact with the wall of the cylinder and whereby the boss is forced inwardly for forcing the periphery of the base radially into sealing contact with the wall of the cylinder.

2. A packing cup for piston assemblies comprising a one-piece cup-shaped body of resilient material having a circular disc-shaped base portion, a lip portion flaring outwardly of the periphery of the base portion, and a solid conical boss formed integrally with the base portion and extending outwardly from the center thereof in the same direction as the lip portion, the apex of said boss projecting beyond the plane of the lip portion, said lip portion having outwardly tapering outer and inner surfaces, the inner tapering surface continuing into a semi-round groove between the boss and the lip portion.

3. A packing cup for piston assemblies comprising a one-piece cup-shaped body of resilient material having a circular disc-shaped base portion with a cylindrical outer periphery, a lip portion flaring outwardly from said cylindrical periphery of the base portion, and a solid conical boss formed integrally and coaxially with the base portion and tapering outwardly from the center thereof within said lip portion in the same direction as the lip portion, the apex of said boss projecting beyond the plane of the lip portion, said lip portion having outwardly converging outer and inner surfaces, the inner surface continuing into a semi-round groove between the boss and the lip portion.

References Cited in the file of this patent

UNITED STATES PATENTS

| | | |
|---|---|---|
| 2,196,995 | La Brie | Apr. 16, 1940 |
| 2,276,027 | Dick | Mar. 10, 1942 |
| 2,552,048 | La Brie | May 8, 1951 |

FOREIGN PATENTS

| | | |
|---|---|---|
| 564,608 | Great Britain | Oct. 5, 1944 |